United States Patent
Uceda-Sosa et al.

(10) Patent No.: US 8,108,451 B2
(45) Date of Patent: Jan. 31, 2012

(54) SYSTEM AND PROGRAM PRODUCTS FOR EFFICIENTLY LOCKING RESOURCES OF A GLOBAL DATA REPOSITORY

(75) Inventors: Rosario A. Uceda-Sosa, Hartsdale, NY (US); Kailash N. Marthi, Poughkeepsie, NY (US); Steven R. Champagne, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/364,060

(22) Filed: Feb. 2, 2009

(65) Prior Publication Data
US 2009/0171963 A1    Jul. 2, 2009

Related U.S. Application Data

(63) Continuation of application No. 09/583,797, filed on May 31, 2000, now Pat. No. 7,487,152.

(51) Int. Cl.
*G06F 12/00* (2006.01)
*G06F 17/30* (2006.01)

(52) U.S. Cl. ............................................. 707/829

(58) Field of Classification Search .................. 707/707, 707/999, 829
See application file for complete search history.

(56) References Cited

U.S. PATENT DOCUMENTS

| | | |
|---|---|---|
| 4,698,752 A | 10/1987 | Goldstein et al. |
| 4,887,204 A | 12/1989 | Johnson et al. |
| 4,958,273 A | 9/1990 | Anderson et al. |
| 5,062,038 A | 10/1991 | Jordan, Jr. |
| 5,119,490 A | 6/1992 | Kurose |
| 5,291,480 A | 3/1994 | Nimon |
| 5,333,316 A | 7/1994 | Champagne et al. |
| 5,355,477 A | 10/1994 | Strickland et al. |
| 5,392,433 A | 2/1995 | Hammersley et al. |
| 5,410,697 A | 4/1995 | Baird et al. |
| 5,448,727 A | 9/1995 | Annevelink |
| 5,475,837 A | 12/1995 | Ishak et al. |
| 5,481,706 A | 1/1996 | Peek |
| 5,485,626 A | 1/1996 | Lawlor et al. |
| 5,551,028 A | 8/1996 | Voll et al. |
| 5,555,388 A | 9/1996 | Shaughnessy |
| 5,623,659 A | 4/1997 | Shi et al. |
| 5,632,034 A | 5/1997 | O'Farrell |

(Continued)

FOREIGN PATENT DOCUMENTS

EP    0794490 A2    10/1997

(Continued)

OTHER PUBLICATIONS

Lehman, et al., "Efficient Locking for Concurrent Operations on B-Trees," ACM Transactions on Database Systems, vol. 6, No. 4, Dec. 1981.

(Continued)

*Primary Examiner* — Diem Cao
(74) *Attorney, Agent, or Firm* — Matthew W. Baca, Esq.; Blanche E. Schiller, Esq.; Heslin Rothenberg Farley & Mesiti P.C.

(57) ABSTRACT

Concurrent access to a global data repository is provided, while minimizing the number of locks acquired to provide the concurrent access. One or more resources within the global data repository have predefined relationships with one or more other resources of the repository. Thus, locking for a particular resource is based on its relationship with one or more other resources of the repository.

20 Claims, 3 Drawing Sheets

U.S. PATENT DOCUMENTS

| | | |
|---|---|---|
| 5,649,141 A | 7/1997 | Yamazaki |
| 5,666,486 A | 9/1997 | Alfieri et al. |
| 5,684,990 A | 11/1997 | Boothby |
| 5,692,178 A | 11/1997 | Shaughnessy |
| 5,694,550 A | 12/1997 | Takeda et al. |
| 5,713,003 A | 1/1998 | DeWitt et al. |
| 5,721,943 A | 2/1998 | Johnson |
| 5,727,203 A | 3/1998 | Hapner et al. |
| 5,734,909 A | 3/1998 | Bennett |
| 5,740,448 A | 4/1998 | Gentry et al. |
| 5,742,813 A | 4/1998 | Kavanagh et al. |
| 5,748,958 A | 5/1998 | Badovinatz et al. |
| 5,752,264 A | 5/1998 | Blake et al. |
| 5,781,908 A | 7/1998 | Williams et al. |
| 5,784,613 A | 7/1998 | Tamirisa |
| 5,794,241 A | 8/1998 | Loaiza |
| 5,802,514 A | 9/1998 | Huber |
| 5,815,701 A | 9/1998 | Slavenburg |
| 5,832,484 A | 11/1998 | Sankaran et al. |
| 5,835,906 A | 11/1998 | Hagersten et al. |
| 5,838,965 A | 11/1998 | Kavanagh et al. |
| 5,842,034 A | 11/1998 | Bolstad et al. |
| 5,845,117 A | 12/1998 | Fujita |
| 5,864,866 A | 1/1999 | Henckel et al. |
| 5,870,759 A | 2/1999 | Bauer et al. |
| 5,890,007 A | 3/1999 | Zinguuzi |
| 5,890,153 A | 3/1999 | Fukuda et al. |
| 5,897,634 A | 4/1999 | Attaluri et al. |
| 5,897,635 A | 4/1999 | Torres et al. |
| 5,913,060 A | 6/1999 | Discavage |
| 5,913,213 A | 6/1999 | Wikstrom et al. |
| 5,920,872 A | 7/1999 | Grewell et al. |
| 5,931,919 A | 8/1999 | Thomas |
| 5,933,825 A | 8/1999 | McClaughry et al. |
| 5,937,189 A | 8/1999 | Branson et al. |
| 5,940,083 A | 8/1999 | Broekhuijsen |
| 5,940,827 A | 8/1999 | Hapner et al. |
| 5,946,685 A | 8/1999 | Cramer et al. |
| 5,950,228 A | 9/1999 | Scales et al. |
| 5,964,838 A | 10/1999 | Cheung et al. |
| 5,966,707 A | 10/1999 | Van Huben et al. |
| 5,983,225 A | 11/1999 | Anfindsen |
| 5,995,998 A | 11/1999 | Furlani et al. |
| 6,012,059 A | 1/2000 | Neimat et al. |
| 6,012,067 A | 1/2000 | Sarkar |
| 6,016,490 A | 1/2000 | Watanabe et al. |
| 6,016,520 A | 1/2000 | Facq et al. |
| 6,026,401 A | 2/2000 | Brealey et al. |
| 6,067,548 A | 5/2000 | Cheng |
| 6,085,198 A | 7/2000 | Skinner et al. |
| 6,088,727 A | 7/2000 | Hosokawa et al. |
| 6,108,654 A | 8/2000 | Chan et al. |
| 6,112,209 A | 8/2000 | Gusack |
| 6,115,703 A | 9/2000 | Bireley et al. |
| 6,115,715 A | 9/2000 | Traversat et al. |
| 6,119,129 A | 9/2000 | Traversat et al. |
| 6,119,145 A | 9/2000 | Ikeda et al. |
| 6,154,764 A | 11/2000 | Nitta et al. |
| 6,154,849 A | 11/2000 | Xia |
| 6,163,855 A | 12/2000 | Shrivastava et al. |
| 6,167,433 A | 12/2000 | Maples et al. |
| 6,182,115 B1 | 1/2001 | Cuomo et al. |
| 6,216,209 B1 | 4/2001 | Cadden et al. |
| 6,226,650 B1 | 5/2001 | Mahajan et al. |
| 6,246,669 B1 | 6/2001 | Chevalier et al. |
| 6,256,641 B1 | 7/2001 | Kasi et al. |
| 6,256,663 B1 | 7/2001 | Davis |
| 6,263,341 B1 | 7/2001 | Smiley |
| 6,272,491 B1 | 8/2001 | Chan et al. |
| 6,275,863 B1 | 8/2001 | Leff et al. |
| 6,304,873 B1 | 10/2001 | Klein et al. |
| 6,308,166 B1 | 10/2001 | Breuker et al. |
| 6,321,236 B1 | 11/2001 | Zollinger et al. |
| 6,338,112 B1 | 1/2002 | Wipfel et al. |
| 6,343,371 B1 | 1/2002 | Flanagan et al. |
| 6,353,828 B1 | 3/2002 | Ganesh et al. |
| 6,363,396 B1 | 3/2002 | Klots et al. |
| 6,370,529 B1 | 4/2002 | Kruglikov et al. |
| 6,381,674 B2 | 4/2002 | Dekonning et al. |
| 6,385,613 B1 | 5/2002 | Grewell et al. |
| 6,389,431 B1 | 5/2002 | Frolund et al. |
| 6,393,485 B1 | 5/2002 | Chao et al. |
| 6,397,227 B1 | 5/2002 | Klein et al. |
| 6,405,220 B1 | 6/2002 | Brodersen et al. |
| 6,418,438 B1 | 7/2002 | Campbell |
| 6,442,533 B1 | 8/2002 | Hinkle |
| 6,446,089 B1 | 9/2002 | Brodersen et al. |
| 6,453,354 B1 | 9/2002 | Jiang et al. |
| 6,466,559 B1 | 10/2002 | Johansson et al. |
| 6,480,847 B1 | 11/2002 | Lienbach et al. |
| 6,480,862 B1 | 11/2002 | Gall |
| 6,484,033 B2 | 11/2002 | Murray |
| 6,484,172 B1 | 11/2002 | Lee et al. |
| 6,493,746 B1 | 12/2002 | Enjou |
| 6,493,804 B1 | 12/2002 | Soltis et al. |
| 6,494,784 B1 | 12/2002 | Matsuyama et al. |
| 6,510,460 B1 | 1/2003 | Callsen et al. |
| 6,529,905 B1 | 3/2003 | Bray et al. |
| 6,529,910 B1 | 3/2003 | Fleskes |
| 6,530,079 B1 | 3/2003 | Choi |
| 6,591,291 B1 | 7/2003 | Gabber et al. |
| 6,594,671 B1 | 7/2003 | Aman et al. |
| 6,594,683 B1 | 7/2003 | Furlani et al. |
| 6,598,068 B1 | 7/2003 | Clark |
| 6,604,208 B1 | 8/2003 | Gosselin |
| 6,618,744 B1 | 9/2003 | Simmons et al. |
| 6,668,278 B1 | 12/2003 | Yen et al. |
| 6,681,225 B1 | 1/2004 | Uceda-Sosa et al. |
| 6,721,742 B1 | 4/2004 | Uceda-Sosa et al. |
| 6,751,617 B1 | 6/2004 | Anfindsen |
| 6,775,689 B1 | 8/2004 | Raghunandan |
| 6,850,613 B2 | 2/2005 | McPartlan et al. |
| 6,865,549 B1 | 3/2005 | Connor |
| 6,964,012 B1 | 11/2005 | Zirngibl et al. |
| 6,965,892 B1 | 11/2005 | Uceda-Sosa et al. |
| 7,054,906 B2 | 5/2006 | Levosky |
| 7,080,076 B1 | 7/2006 | Williamson et al. |
| 7,185,076 B1 | 2/2007 | Novaes et al. |
| 7,216,227 B2 | 5/2007 | Grynberg |
| 7,356,332 B2 | 4/2008 | Pell et al. |
| 7,398,529 B2 | 7/2008 | Prabakaran et al. |
| 7,493,390 B2 | 2/2009 | Bobde et al. |
| 7,783,741 B2 | 8/2010 | Hardt |
| 7,822,819 B1 | 10/2010 | Levosky |
| 2002/0010711 A1 | 1/2002 | Nakanishi et al. |
| 2002/0075305 A1 | 6/2002 | Beaton et al. |
| 2002/0138588 A1 | 9/2002 | Leeds |
| 2002/0152272 A1 | 10/2002 | Yairi |
| 2003/0158888 A1 | 8/2003 | Bjorklund et al. |
| 2004/0193685 A1 | 9/2004 | Proehl |
| 2005/0154665 A1 | 7/2005 | Kerr |
| 2005/0204011 A1 | 9/2005 | Velayudham |
| 2005/0228899 A1 | 10/2005 | Wendkos et al. |
| 2006/0026438 A1 | 2/2006 | Stern et al. |
| 2008/0195953 A1 | 8/2008 | Sen |
| 2010/0333092 A1 | 12/2010 | Stefansson et al. |

FOREIGN PATENT DOCUMENTS

| | | |
|---|---|---|
| EP | 1117210 A2 | 7/2001 |
| JP | 07200321 A | 8/1995 |
| JP | 10187638 | 7/1998 |
| WO | WO9637834 | 11/1996 |
| WO | WO9921091 | 4/1999 |
| WO | WO0058825 | 10/2000 |
| WO | WO0184338 A2 | 11/2001 |

OTHER PUBLICATIONS

Turek, et al., "Locking without Blocking: Making Lock Based Concurrent Data Structure Algorithms Nonblocking," Proceedings of the Eleventh ACM Sigact-Sigmod-Sigart Symposium on Principles of Database Systems, Jul. 1992.

Biliris, A., "Operation Specific Locking in B-Trees," Proceedings of the Sixth ACM Sigact-Sigmod-Sigart Symposium on Principles of Database Systems, Jun. 1987.

Lisanskiy, Ilya, "Something About Haystack," Feb. 3, 1999.

Lee et al., "A Multi-Granularity Locking Model for Concurrency Control in Object-Oriented Database Systems," IEEE Transactions on Knowledge and Data Engineering, vol. 8, No. 1, Feb. 1996.

Barnes et al., "Automatic Cache Invalidation and Refresh in a Client Server Environment," IBM Technical Disclosure Bulletin, vol. 36, No. 7, Jul. 1993, pp. 399-404 (Abstract Only).

Greenfield et al., "Dynamic Allocation of Processes and Threads for Transaction Processing,"IBM Technical Disclosure Bulletin, vol. 41, No. 1, Jan. 1998, pp. 499-500 (Abstract only).

Office Action for U.S. Appl. No. 09/584,609 (U.S. Patent No. 6,965,892) dated Dec. 14, 2004, pp. 1-8.

Final Office Action for U.S. Appl. No. 09/584,609 (U.S. Patent No. 6,965,892) dated Jan. 30, 2004, pp. 1-14.

Office Action for U.S. Appl. No. 09/584,609 (U.S. Patent No. 6,965,892) dated Aug. 6, 2003, pp. 1-10.

Office Action for U.S. Appl. No. 09/583,585 (U.S. Patent No. 6,721,742) dated Jul. 2, 2003, pp. 1-15.

Final Office Action for U.S. Appl. No. 09/584,523 (U.S. Patent No. 6,681,225) dated Mar. 5, 2003, pp. 1-13.

Office Action for U.S. Appl. No. 09/584,523 (U.S. Patent No. 6,681,225) dated Aug. 14, 2002, pp. 1-9.

Final Office Action for U.S. Appl. No. 09/583,677 (U.S. Patent No. 7,185,076) dated Aug. 19, 2004, pp. 1-12.

Office Action for U.S. Appl. No. 09/583,677 (U.S. Patent No. 7,185,076) dated Jan. 28, 2004, pp. 1-12.

Office Action for U.S. Appl. No. 11/550,973 dated Jan. 26, 2009, pp. 1-18.

Final Office Action for U.S. Appl. No. 11/550,973 dated Aug. 6, 2009, pp. 1-18.

Office Action for U.S. Appl. No. 11/550,973 dated Jan. 22, 2010, pp. 1-19.

Office Action for U.S. Appl. No. 11/550,973 dated Jul. 21, 2010, pp. 1-22.

Final Office Action for U.S. Appl. No. 11/550,973 dated Feb. 3, 2011, pp. 1-18.

fig. 1 fig. 2 fig. 3 fig. 4 fig. 5

SYSTEM AND PROGRAM PRODUCTS FOR EFFICIENTLY LOCKING RESOURCES OF A GLOBAL DATA REPOSITORY

CROSS-REFERENCE TO RELATED APPLICATIONS

This application is a continuation of co-pending U.S. patent application Ser. No. 09/583,797, filed May 31, 2000, entitled "Method for Efficiently Locking Resources of a Global Data Repository," the entirety of which is hereby incorporated herein by reference.

This application also contains subject matter which is related to the subject matter of the following applications, each of which is assigned to the same assignee as this application and filed on the same day as this application. Each of the below listed applications is hereby incorporated herein by reference in its entirety:

"Method, System And Program Products For Modifying Globally Stored Tables Of A Client-Server Environment," Uceda-Sosa et al., U.S. patent application Ser. No. 09/583,585, filed May 31, 2000, now U.S. Pat. No. 6,721,742, issued Apr. 13, 2004;

"Method, System And Program Products For Concurrent Write Access To A Global Data Repository," Uceda-Sosa et al., Ser. No. 09/584,523, filed May 31, 2000, now U.S. Pat. No. 6,681,225, issued Jan. 20, 2004; and "Method, System And Program Products For Concurrently Accessing A Global Data Repository By Multithreaded Clients," Uceda-Sosa et al., Ser. No. 09/584,609, filed May 31, 2000, now U.S. Pat. No. 6,965,892, issued Oct. 26, 2005.

TECHNICAL FIELD

This invention relates, in general, to a distributed computing environment, and in particular, to managing the locking of resources located in a global repository of the distributed computing environment.

BACKGROUND OF THE INVENTION

Distributed systems are highly-available, scalable systems that are utilized in various situations, including those situations that require a high-throughput of work or continuous or nearly continuous availability of the system.

Typically, users of a distributed system desire access to and modification of data residing in a global repository accessible by one or more users of the system. In order to prevent corruption of the data, techniques are needed to manage the access and modification of the data.

For instance, assume that a repository has a hierarchical topology having various levels. Previously, in order to lock requested resources of the repository, hierarchical locks (e.g., read/write locks) were used. Hierarchical locks require, however, the employment of a lock at each level of the hierarchy. Thus, if the topology has five (5) levels, and a resource on the fifth level is to be locked, then five locks are needed.

The employment and management of so many locks degrades system performance. Thus, a need still exists for an efficient locking facility that enables concurrent access to resources of a data repository without requiring locks on each level of the data repository topology.

SUMMARY OF THE INVENTION

The shortcomings of the prior art are overcome and additional advantages are provided through the provision of at least one program storage device readable by a machine, tangibly embodying at least one program of instructions executable by the machine to perform a method of managing the locking of resources of a data repository. The method includes, for instance, having a data repository including a hierarchical structure of a plurality of dependently sequenced resources, the hierarchical structure including one or more resources having a reference-based relationship and one or more resources having a containment-based relationship; determining whether a relationship between one resource and another resource of the data repository is a containment-based relationship or whether the relationship is a reference-based relationship, wherein the relationship between the one resource and the another resource is a containment-based relationship if the one resource is accessed through the another resource and if there is only one reference from instances of the one resource to the another resource, and the relationship between the one resource and the another resource is a reference-based relationship if the one resource is accessed through the another resource and if there are more than one reference from instances of the one resource to the another resource; locking at least one resource of the one resource and the another resource using a chained locking strategy, in response to the determining indicating the relationship is a containment-based relationship; and locking at least one resource of the one resource and the another resource using a reference-based locking strategy, in response to the determining indicating the relationship is a reference-based relationship, wherein a chained locking strategy is a different locking strategy than a reference-based locking strategy, and wherein the locking of the at least one resource is further based on an operation to be performed.

Systems and methods corresponding to the above-summarized program products are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with one or more aspects of the present invention, a locking facility is provided that enables concurrent access to a complex data structure, while minimizing the lock acquisition necessary to access a particular resource of the complex data structure.

Figure 1:
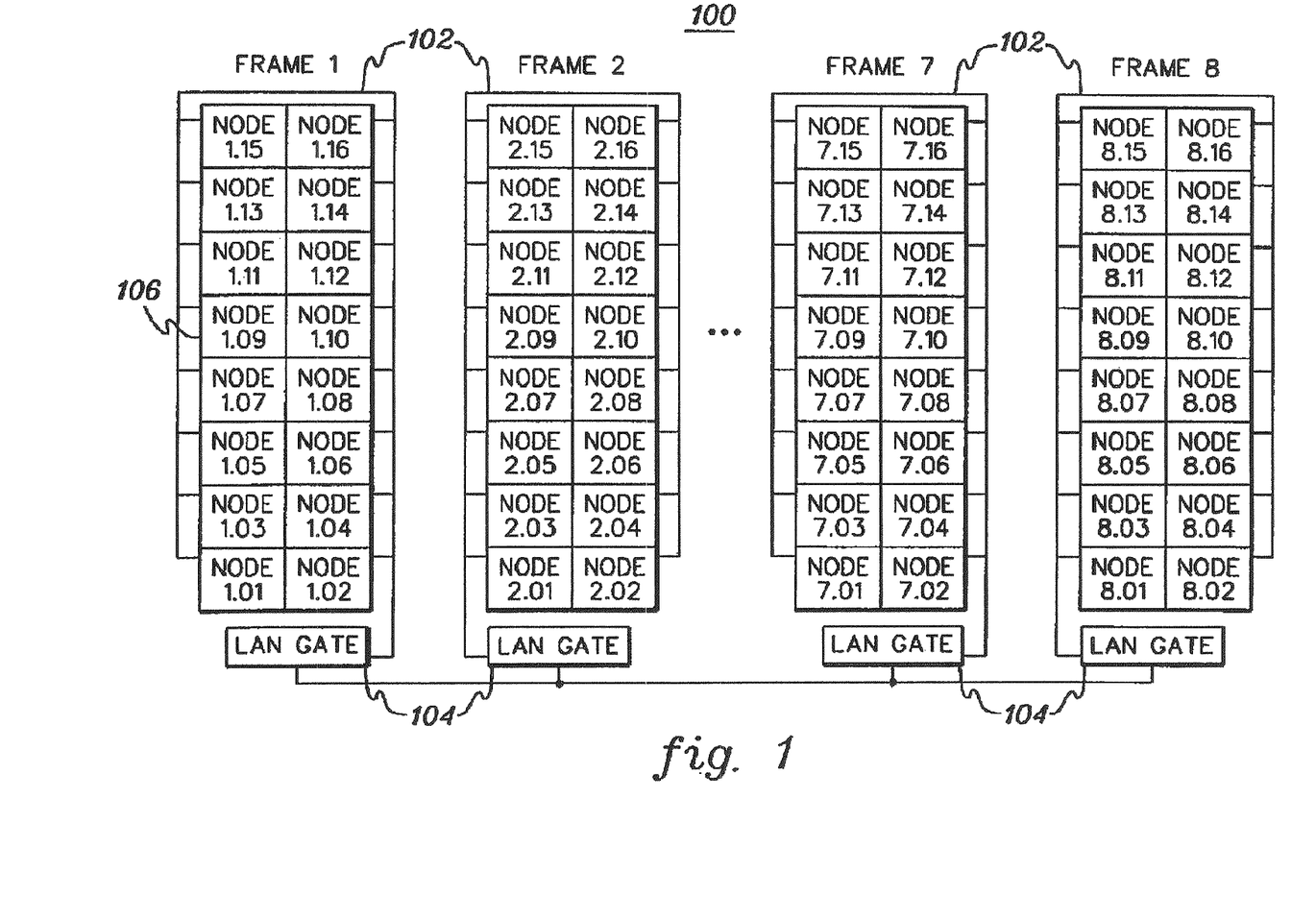
FIG. 1 depicts one example of a distributed computing environment incorporating and using one or more aspects of the present invention.

The complex data structure (e.g., a global data repository) is to be concurrently accessible by a plurality of users executing within a distributed computing environment. One example of a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed within LINUX and/or Windows operation systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
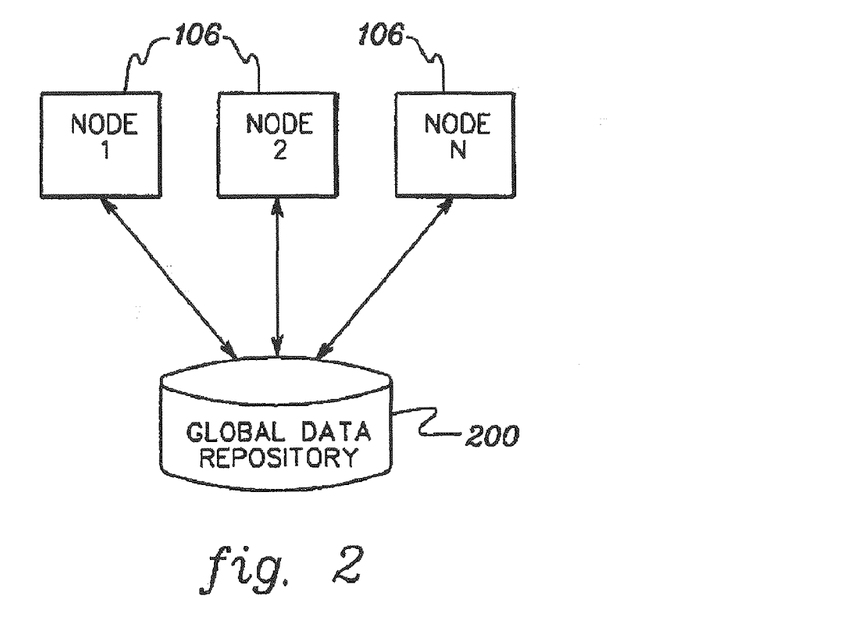
FIG. 2 depicts one example of a plurality of nodes of FIG. 1 coupled to a global data repository, in accordance with an aspect of the present invention.

At least a plurality of the nodes of the distributed computing environment are capable of sharing resources and data with one another. In order to facilitate the sharing of data, the nodes are coupled to one or more global data repositories 200 (FIG. 2). In one example, each data repository is a relational repository, in which the data (e.g., configuration data) is stored in one or more resources, such as relational tables, that can be concurrently accessed by users of the nodes. Each data repository is remote from the nodes, in this example. However, in other examples, the repository can be local to one or more of the nodes. Further, the repository can be remote or local to users of the repository.

Examples of a data repository and the management of such is described in, for instance, the following U.S. patent applications: "Method, System And Program Products For Managing A Clustered Computing Environment," Novaes, et al., Ser. No. 09/583,677, filed May 31, 2000, now U.S. Pat. No. 7,185,076, issued Feb. 27, 2007; "Method, System And Program Products For Modifying Globally Stored Tables Of A Client-Server Environment," Uceda-Sosa, et al., Ser. No. 09/583,585, filed May 31, 2000, now U.S. Pat. No. 6,721,742, issued Apr. 13, 1004; "Method, System And Program Products For Concurrent Write Access To A Global Data Repository," Uceda-Sosa, et al., Ser. No. 09/584,523, filed Jan. 20, 2004, now U.S. Pat. No. 6,681,225, issued Jan. 20, 2004; and "Method, System And Program Products For Concurrently Accessing A Global Data Repository By Multithreaded Clients," Uceda-Sosa, et al., Ser. No. 09/584,609, filed May 31, 2000, now U.S. Pat. No. 6,965,892, issued Nov. 15, 2005, each of which is hereby incorporated herein by reference in its entirety.

Figure 3:
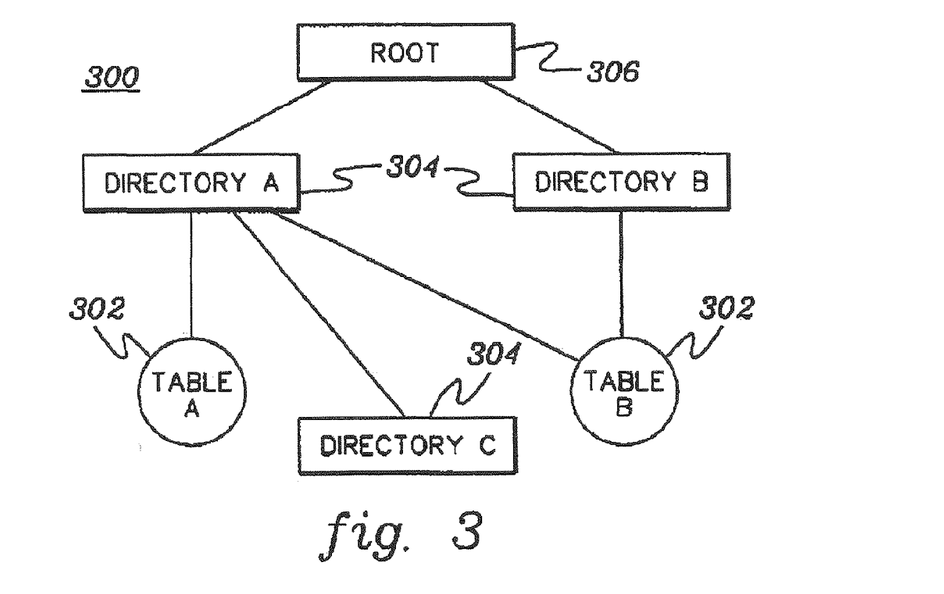
FIG. 3 depicts one example of a hierarchical topology of the global data repository of FIG. 2, in accordance with an aspect of the present invention.

Further details regarding a global data repository are described with reference to FIG. 3. The resources (e.g., tables, directories) of the data repository have hierarchical relationships with one another thus, forming one or more linked data trees 300. Each linked data tree is managed by a repository server coupled to the data repository and can be accessed concurrently by, for instance, logged users. In one example, the main data unit of the repository is a relational table 302, which, in this example, is the smallest lockable data unit of the repository. (In other embodiments however, the smallest lockable data unit can be something other than a table.) Each table includes one or more rows and columns.

Tables exist in the context of at least one directory 304. Directories can include other directories and/or tables. In this example, there is a distinguished directory, called the root directory 306, which is the topmost directory. The root directory cannot be deleted. Since each directory defines a name space, it is desirable at times for the same table or subdirectory to appear under different directories (referred to as parent directories). In this case, each of the parent directories has a hard link to the child resource (e.g., table or subdirectory), for the children will not be removed from the system until they have been deleted from all of the parent directories. This scenario provides the most generic data topology for the hierarchical (directory-oriented) database, because the data tree becomes a graph. Furthermore, this graph changes dynamically as new directories and tables are added or deleted.

Various operations can be performed on the resources of a repository, and these operations include, for instance, create, delete, read and write. When performing these operations, locks are typically employed, such that concurrent access to the data repository is provided. In one example, it is assumed that each resource is equipped with a Read/Write lock.

Since the repository has a hierarchical topology, there are various relationships among the resources of the repository and the locks of the repository. In the example described herein, these relationships are based on object-oriented concepts. Thus, the examples herein refer to instances and references (which is further described below). For example, an instance of X indicates an instance of Type X, which may include a directory or a table, as examples. Likewise, an instance of Y indicates an instance of Type Y, which also may include a directory or table, as examples. However, the use of object-oriented concepts is only one example. The facilities described herein are equally applicable to other concepts, such as procedural languages. For example, in the case of procedural languages, instead of employing the terms instances, objects and references, the terms structures and pointers may be used.

The type of locking relationship that exists depends on the particular relationship between the resources. For example, assume there are two resources, an instance of X (a.k.a., X) and an instance of Y (a.k.a., Y) that are independent and global (i.e., accessible from several threads). If an operation desires access to both of these resources, then it sequences their lock acquisition (in the order in which they are mentioned). Thus, the relationship of the resources, as well as the lock acquisition, is considered independently sequenced.

However, in a further example, assume that X is accessed through Y. In this scenario, the acquisition of locks for X ties to the acquisition of locks for Y, also. Thus, the resources and the lock acquisition are dependently sequenced.

There are two cases of dependently sequenced resources discussed herein. The first case relates to containment, and the second case relates to reference, each of which is described in detail below. Again, these relationships (e.g., containment and reference) are described in terms of object-oriented concepts, but this is only one example.

Containment:

If there is exactly one reference from X to Y, whenever Y exists, then X is a container for Y, and Y is considered a unireferenced resource. In containment, X is not deleted throughout the life of the process, or in some way, it is guaranteed that instances of Y will not be accessed after X has been destroyed. The locking acquisition for containment is referred to herein as chained locking.

With a chained locking strategy, the particular lock(s) to be obtained depend on, for instance, the operation to be performed, as well as the relationship of the resources, which is containment, in this scenario. Examples of the locks obtained for the various operations that can be performed include the following.

In order to create an instance of Y, a write lock is obtained for X. Further, in order to delete an instance of Y, write locks to both X and Y are obtained. However, in order to read an instance of Y, a read lock of Y is obtained, without the need for obtaining a lock for X. Similarly, to write to an instance of Y, a write lock to Y is obtained, and no lock for X is needed.

Reference:

If there may be more than one reference from an instance of X to an instance of Y, X is a reference to Y. With a reference relationship, the instance of Y is created on the first reference from an instance of X, and deleted when the last reference has been removed.

Figure 4:
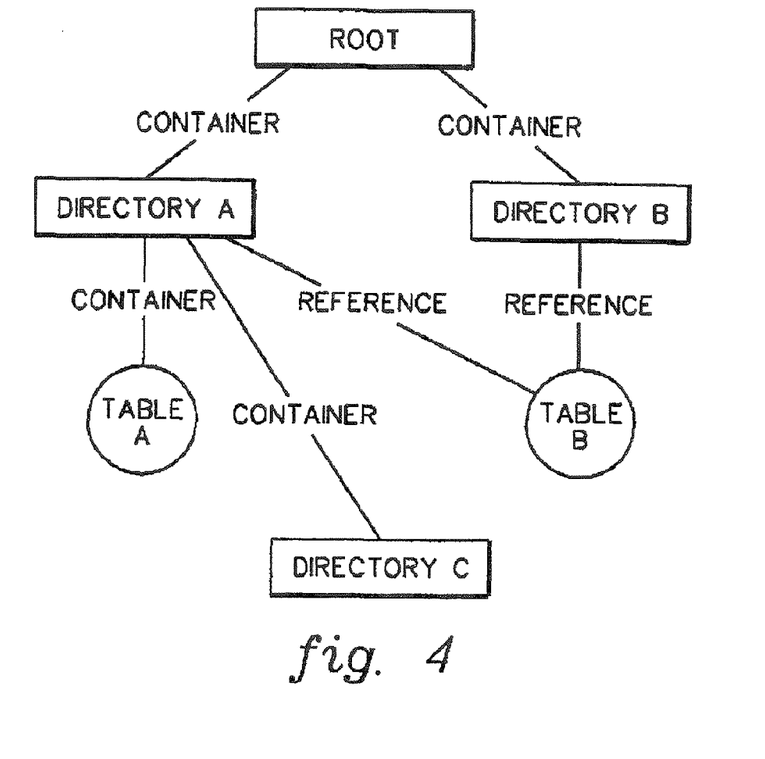
FIG. 4 depicts another example of the hierarchical topology of FIG. 3 annotated with relationships, in accordance with an aspect of the present invention.

For example, if a resource (e.g., a table or a directory) can be included in more than one directory, such a resource is considered multireferenced. As an example Table B of FIG. 4 is multireferenced because it is included in and may be referenced by both Directory A and Directory B. Multireferenced resources are deleted either explicitly (by issuing, for instance, a delete table request) or implicitly, by deleting its parent directories. When a multireferenced resource is explicitly deleted, it is deleted from all of its directories. A multireferenced resource is implicitly deleted only when it has been deleted from all of its directories. A directory cannot be, in one example, multireferenced from subdirectories (i.e., loops in the reference graph of a directory are forbidden).

The locking acquisition for reference is referred to herein as a reference-based locking strategy. As with the chained locking strategy, the reference-based locking acquisition strategy is also based on the operation to be performed, as well as the relationship of the resources, which is reference, in this scenario. Examples of the locks obtained for the various operations that can be performed include the following:

In order to delete X, a write lock to X is obtained. Further, in order to create Y, a write lock to X is obtained (this also imports a first reference from the instance of X to Y). For a deletion of Y, a write lock to all of the instances of X that hold a reference to Y is obtained. This implies that all the references are removed. For a read of Y, a read lock to an instance of X and a read lock to Y are obtained. For a write of Y, a read lock to an instance of X and a write lock to Y are obtained. In order to set/remove X's reference to Y, a write lock to X is obtained. If the reference is bidirectional, then a write lock to Y is also obtained.

In accordance with an aspect of the present invention, relationship information is stored, for instance, within each directory (in the client and/or server). In particular, each parent directory includes information that describes the relationship of the directory to its resources. For instance, each parent directory includes for each of its resources, a reference to the resource; and the characterization of the relationship with the resource as either containment in the case of unireferenced resources and reference in the case of multireferenced resources (see FIG. 4). Further, each resource keeps a reference count of the number of references made to it. By default, this count is 1. (In other embodiments, other information may be stored in the resources. Further, the relationship information may be stored in less than all of the parent directories or it may be stored in one or more resources.)

Figure 5:
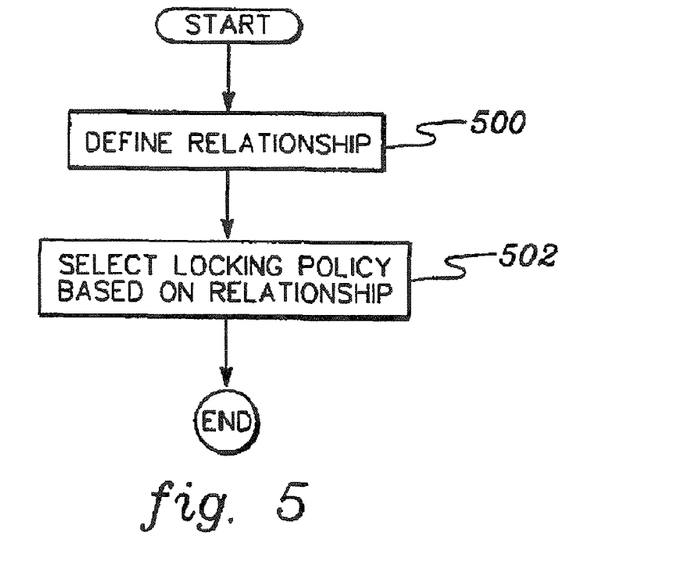
FIG. 5 depicts one embodiment of the logic associated with managing the locking of resources of a global data repository, in accordance with an aspect of the present invention.

As described above, in accordance with an aspect of the present invention, locking of a resource is based upon, for instance, the relationship of the resource with one or more other resources of the repository. Thus, prior to selecting a locking strategy, STEP 502 (FIG. 5), the relationship of the resource is defined, STEP 500.

In one embodiment, in order to establish whether a container or reference relationship is appropriate, and thus, the appropriate locking strategy, the following policies are followed:

1) The root directory is considered a container of its tables and subdirectories, since it cannot be deleted and referenced.
2) Other directories are considered containers of their tables, as long as they are not multireferenced.
3) When acquiring locks for a set of resources, the same order is followed: First, acquire write locks by lexicographical order, then read locks by lexicographical order.
4) Assume a hard link is made from a directory, DirA, to a resource, Resource X, (in the case of a directory, assume that it is a legal link) residing in DirB. Suppose that X was unireferenced prior to the link from DirA. The following locking strategy is used:
   (*) Lock both DirA and DirB for write (according to the other specified in 3 above). Update the links of DirA and DirB to X to reference. Updated the reference count for X.
5) When a hard link is made from a directory, DirA, to a resource, Resource X, which is multireferenced, the reference strategy described above is followed. Further, the reference count for X is updated.
6) Assume that a hard link is removed from a directory, DirA, to Resource X, which is multireferenced. The strategy for deletion of the link in the reference locking strategy is followed. Further, the reference count for X is updated. However, if the count is reduced from 2 to 1, an exception is made. In particular, suppose the another competing link is from DirB. Then, both DirA and DirB are locked (by releasing all previous locks and starting from scratch). Further, the link characterization of DirB is modified from reference to container. Thereafter, the link is removed from DirA, and the reference count of X is updated.
7) When accessing a resource, the locking policies of all the links leading to it are respected.

Described above are various scenarios for acquiring locks based on relationships, such that maximum concurrency access to the global data repository is facilitated, while minimizing the number of locks obtained. Further scenarios are described below, in which the improved speed in obtaining lock acquisitions for read/write operations (especially for unireferenced resources) is illustrated.

Examples of obtaining locks based on the relationship of the resource is described below:

(1) For a read/write operation on DirC (see FIG. 4): Lock DirC for read or write, instead of acquiring a set of locks corresponding to all of the resources in the path; thus, significantly reducing the number of locks acquired.

(2) For a write operation on TabB (see FIG. 4): A read lock to DirB and a write lock to TabB are obtained.

As described above, advantageously, maximum concurrency access to a data repository is provided, while minimizing the lock acquisition necessary to access a resource (e.g., table or directory) of the repository.

In one embodiment, the repository server, which is coupled to and manages the data repository, is multithreaded. Thus, one or more aspects of the present invention advantageously provide the ability to read or write a set of related resources in a dynamic graph that can be globally accessed in a multi-threaded environment.

Although the description above focused on one data repository, the capabilities of the present invention extend to a plurality of data repositories of a computing environment. One or more of the repositories can be local and/or remote to the users accessing the repositories.

Further, one or more aspects of the present invention are applicable to homogeneous systems, as well as heterogeneous systems. As one example, capabilities are provided to facilitate the interoperability of the systems of a heterogeneous environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. At least one program storage device readable by a machine, tangibly embodying at least one program of instructions executable by the machine to perform a method of managing the locking of resources of a data repository, said method comprising:

having a data repository comprising a hierarchical structure of a plurality of dependently sequenced resources, said hierarchical structure comprising one or more resources having a reference-based relationship and one or more resources having a containment-based relationship;

determining whether a relationship between one resource and another resource of the data repository is a containment-based relationship or whether the relationship is a reference-based relationship, wherein the relationship between the one resource and the another resource is a containment-based relationship if the one resource is accessed through the another resource and if there is only one reference from instances of the one resource to the another resource, and the relationship between the one resource and the another resource is a reference-based relationship if the one resource is accessed through the another resource and if there are more than one reference from instances of the one resource to the another resource;

locking at least one resource of the one resource and the another resource using a chained locking strategy, in response to the determining indicating the relationship is a containment-based relationship; and locking at least one resource of the one resource and the another resource using a reference-based locking strategy, in response to the determining indicating the relationship is a reference-based relationship, wherein a chained locking strategy is a different locking strategy than a reference-based locking strategy, and wherein said locking of said at least one resource is further based on an operation to be performed.

2. The at least one program storage device of claim 1, wherein the relationship is a containment-based relationship, and the one resource references the another resource, and wherein the locking comprises write locking the one resource in order to create an instance of the another resource.

3. The at least one program storage device of claim 1, wherein the relationship is a containment-based relationship, and the one resource references the another resource, and wherein the locking comprises write locking the one resource and the another resource in order to delete an instance of the another resource.

4. The at least one program storage device of claim 1, wherein the relationship is a containment-based relationship, and the one resource references the another resource, and wherein the locking comprises read locking the another resource in order to read therefrom.

5. The at least one program storage device of claim 1, wherein the relationship is a containment-based relationship, and the one resource references the another resource, and wherein the locking comprises write locking the another resource in order to write thereto.

6. The at least one program storage device of claim 1, wherein the relationship is a reference-based relationship, and the one resource references the another resource, and wherein the locking comprises write locking the one resource in order to delete the one resource.

7. The at least one program storage device of claim 1, wherein the relationship is a reference-based relationship, and the one resource references the another resource, and wherein the locking comprises write locking the one resource in order to create an instance of the another resource.

8. The at least one program storage device of claim 1, wherein the relationship is a reference-based relationship, and at least one of the one resource references the another resource, and wherein the locking comprises write locking the at least one of the one resource in order to delete the another resource.

9. The at least one program storage device of claim 1, wherein the relationship is a reference-based relationship, and the one resource references the another resource, and wherein the locking comprises read locking the one resource and the another resource in order to read the another resource.

10. The at least one program storage device of claim 1, wherein the relationship is a reference-based relationship, and at least one of the one resource references the another resource, and wherein the locking comprises read locking at least one of the one resource and write locking the another resource in order to write to the another resource.

11. The at least one program storage device of claim 1, wherein the relationship is a referenced-based relationship, and the one resource and the another resource reference a third resource, and wherein the locking comprises read locking one of the one resource and the another resource and write locking the third resource in order to write to the third resource.

12. A system of managing the locking of resources of a data repository, said system comprising:
  a storage comprising a data repository, said data repository comprising a hierarchical structure of a plurality of dependently sequenced resources, said hierarchical structure comprising one or more resources having a reference-based relationship and one or more resources having a containment-based relationship; and
  at least one processing node coupled to the storage, said at least one processing node to perform a method, said method comprising:
    determining whether a relationship between one resource and another resource of the data repository is a containment-based relationship or whether the relationship is a reference-based relationship, wherein the relationship between the one resource and the another resource is a containment-based relationship if the one resource is accessed through the another resource and if there is only one reference from instances of the one resource to the another resource, and the relationship between the one resource and the another resource is a reference-based relationship if the one resource is accessed through the another resource and if there are more than one reference from instances of the one resource to the another resource;
    locking at least one resource of the one resource and the another resource using a chained locking strategy, in response to the determining indicating the relationship is a containment-based relationship; and
    locking at least one resource of the one resource and the another resource using a reference-based locking strategy, in response to the determining indicating the relationship is a reference-based relationship, wherein a chained locking strategy is a different locking strategy than a reference-based locking strategy, and wherein said locking of said at least one resource is further based on an operation to be performed.

13. The system of claim 12, wherein the relationship is a containment-based relationship, and the one resource references the another resource, and wherein the locking comprises write locking the one resource in order to create an instance of the another resource.

14. The system of claim 12, wherein the relationship is a containment-based relationship, and the one resource references the another resource, and wherein the locking comprises write locking the one resource and the another resource in order to delete an instance of the another resource.

15. The system of claim 12, wherein the relationship is a containment-based relationship, and the one resource references the another resource, and wherein the locking comprises read locking the another resource in order to read therefrom.

16. The system of claim 12, wherein the relationship is a containment-based relationship, and the one resource references the another resource, and wherein the locking comprises write locking the another resource in order to write thereto.

17. The system of claim 12, wherein the relationship is a reference-based relationship, and the one resource references the another resource, and wherein the locking comprises write locking the one resource in order to delete the one resource.

18. The system of claim 12, wherein the relationship is a reference-based relationship, and the one resource references the another resource, and wherein the locking comprises write locking the one resource in order to create an instance of the another resource.

19. The system of claim 12, wherein the relationship is a reference-based relationship, and at least one of the one resource references the another resource, and wherein the locking comprises read locking at least one of the one resource and write locking the another resource in order to write to the another resource.

20. The system of claim 12, wherein the relationship is a referenced-based relationship, and the one resource and the another resource reference a third resource, and wherein the locking comprises read locking one of the one resource and the another resource and write locking the third resource in order to write to the third resource.

* * * * *